United States Patent [19]

Hill

[11] 4,364,912
[45] Dec. 21, 1982

[54] POST PRECIPITATION CONTROL OF LOW-IRON PHOSPHORIC ACID, WITHOUT PERLITE

[75] Inventor: Richard N. Hill, Lakeland, Fla.

[73] Assignee: W. R. Grace & Co., New York, N.Y.

[21] Appl. No.: 284,623

[22] Filed: Jul. 20, 1981

[51] Int. Cl.³ .............................................. C01B 25/16
[52] U.S. Cl. ................................................ 423/321 R
[58] Field of Search ............................ 423/321 R, 320

[56] References Cited

U.S. PATENT DOCUMENTS 3,338,675  8/1967  Gilbert ................................ 423/321
4,110,422  8/1978  Hill .................................... 423/321

Primary Examiner—O. R. Vertiz
Assistant Examiner—Gregory A. Heller
Attorney, Agent, or Firm—William W. McDowell, Jr.; Charles L. Harness

[57] ABSTRACT

The Hill process for control of post-precipitation in wet process phosphoric acid can be made to work on low-iron phosphate rock, without the need of added perlite or other aluminum silicate.

6 Claims, 1 Drawing Figure

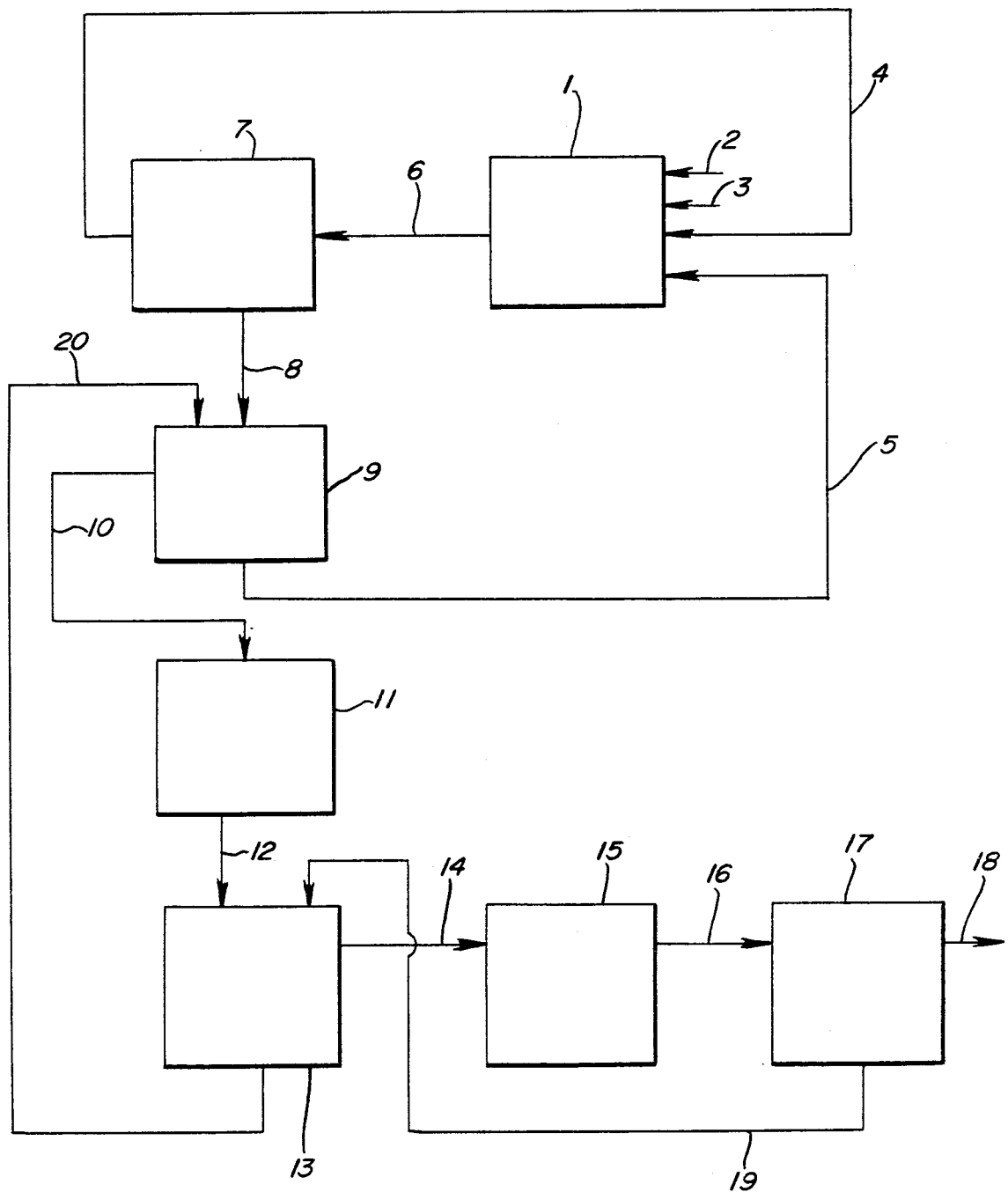

POST PRECIPITATION CONTROL OF LOW-IRON PHOSPHORIC ACID, WITHOUT PERLITE

BACKGROUND OF THE INVENTION

In the conventional methods for the production of wet process phosphoric acid, finely ground phosphate rock is reacted with dilute phosphoric acid (10% $P_2O_5$ to 25% $P_2O_5$) and sulphuric acid which may or may not be diluted. The reaction product is leached (i.e., digested or reacted with the acid) to yield a crude aqueous phosphoric acid solution in which is suspended a substantial quantity of solid impurities. This slurry is filtered to separate most of the undissolved calcium sulfate and other solid impurities to yield a crude (22% $P_2O_5$ to 45% $P_2O_5$) aqueous product sometimes known as the number one filtrate. This filtrate contains suspended, finely divided, impurities that were not removed during the solid-liquid separation step plus solids that have crystallized after filtration. The solution also contains dissolved impurities. Reference is made to Chapter 16 of Volume II, Phosphorus and its Compounds, Van Wazer, Interscience Publishers (1961).

The problems occasioned by suspended and dissolved impurities are particularly acute with respect to wet process phosphoric acid. Variable quantities of impurities in the phosphate rock such as organics, calcium, potassium, sodium, aluminum, iron, strontium, titanium, silicon, uranium, vanadium, fluorine, magnesium, etc. are put into solution during the reaction of the phosphate rock with sulphuric and/or phosphoric acid. Standing, cooling, or concentration of the phosphoric acid solution results in additional solids being formed and precipitated to form a sludge consisting mainly of complexed iron, aluminum, potassium, sodium, calcium, etc.; and phosphates, fluorides, silicates, sulphates, etc. This is known in the art as post-precipitation.

Conventional concentrated wet process phosphoric acid, upon standing or during shipment in tank cars or the like, deposits a layer of solid matter forming sludge as above described, which renders handling stored or shipped acid exceedingly difficult and frequently economically unfeasible. Some solids may be removed from the crude solution by conventional filtration or centrifugation. With respect to conventional filtration, however, the concentrated acid is very viscous and difficult to filter. Further, the solids are of such nature that they readily blind the filter cloth and the solids are difficult to remove from the filter. With respect to conventional centrifugation, many of the finely divided solids will not be removed, particularly the organic particles, which are lighter and are not removed with the larger heavier inorganic solids from the solution.

SUMMARY OF THE INVENTION

This invention relates to a method of inhibiting post-precipitation in concentrated phosphoric acid and to the resultant product, which may be stored for long periods of shipped long distances without deleterious post-precipitation. In accordance with the present invention it has been discovered that an eminently satisfactory clarified, stabilized, concentrated phosphoric acid, produced from crude wet process phosphoric acid, can be achieved by means of a series of specific but interdependent steps.

My invention requires a clarified filtrate feed. If the available No. 1 filtrate contains suspended solids, it must first be clarified. Crude phosphoric acid from the conventional wet process acid filter at 22% to 35% $P_2O_5$ concentration (No. 1 filtrate) ordinarily contains 0.5–8.0 wt. % suspended solids and accordingly is first substantially clarified. In this step it has been found satisfactory to remove 85% to 98% by volume of the suspended solids. These solids may be returned to the digestion circuit or to the phosphoric acid filter feed tank. The $Fe_2O_3/P_2O_5$ ratio in the feed acid must not exceed 0.03.

The clarified acid with less than 2% by volume of suspended solids is then passed to a conventional wet process phosphoric acid evaporator. After reaching a concentration of 46% to 52% $P_2O_5$ the evaporator product is introduced to a crystallizer, then subjected to settling where a small portion if removed as underflow containing approximately 10 to 40% by weight of solids. This underflow may be returned to the clarifier, or it may be sent to the 30% filter feed tank or to diammonium phosphate, run-of-pile triplesuperphosphate, or granular triplesuperphosphate circuit, or it may be separated by centrifugation or filtration to recover the $P_2O_5$ values. The overflow goes to another evaporator and is brought up to 56 to 62% $P_2O_5$, preferably 59–61% $P_2O_5$. This product may be immediately loaded in a tank car or stored in tanks until ready to be shipped or used.

The Hill process for the control of post-precipitation in wet process phosphoric acid is well known. It is used commercially in Florida, and has been described in several U.S. patents and pending applications, viz., U.S. Pat. Nos. 4,110,422, 4,164,550, 4,248,846, 4,250,154, Ser. No. 54,449 filed July 3, 1979, Ser. No. 111,013 filed Jan. 10, 1980, Ser. No. 110,805 filed Jan 10, 1980, Ser. No. 210,722 filed Nov. 28, 1980, and Ser. No. 191,940, filed Sept. 29, 1980. All these patents and applications are herein incorporated by reference.

As is known, the commercial Hill process comprises several essential steps, plus various optional steps. The essential steps are;

(1) Start with Number 1 filtrate. This is a crude dilute phosphoric acid ordinarily analyzing 22–45 wt. % $P_2O_5$ and preferably 22–35%, and even more preferably, 25–32%. This acid must be thoroughly clarified, e.g., by polymer addition and settling. At least 85% of suspended solids are moved in this clarification operation.

(2) Perlite is added to the clarified product.

(3) The perlite-acid mix is evaporated, e.g., to 46–52% $P_2O_5$.

(4) The concentrated acid is passed to a crystallizer-settler, for a residence time of at least 8 hours; 8–60 hours is suitable. (Present commercial settling time is about 30 hours.)

(5) Clear acid from (3) is further concentrated to 56–62% $P_2O_5$, and preferably 59–61%.

Optional steps are return of crystallizer-settler sludge to the clarifier; return of clarifier sludge to the reaction train; and addition of sulfuric acid at one or more points downstream from the clarifier.

A comparison of the process of this invention as described will show that it is substantially identical to the above 4-step process, with the following exceptions:

(1) The invention is specific to low-iron feed. By this is meant, the $Fe_2O_3/P_2O_5$ weight ratio for the acid going into the clarifier must not exceed 0.03. Preferably, it is 0 to 0.028.

(2) No perlite or other aluminum silicate is added.

(3) There is a little more post-precipitation in the instant process, but the precipitate is fluffy and is as manageable as in the standard Hill process.

The FIGURE shows a schematic flow sheet for using the invention on a large scale.

The process as described in the FIGURE starts with the reaction train shown generally at 1. Into the reaction train are sent phosphate rock at 2, sulfuric acid at 3, recycled dilute phosphoric acid (about 22% $P_2O_5$) at 4. Optionally clarifier underflow is recycled to the reaction train at 5. The crude acid slurry leaves the reaction train at 6 and goes to the filtration operation shown generally at 7. The filtered acid, commonly known as "No. 1 filtrate" leaves the filtration operation at 8 and enters the clarifier at 9. Optionally sludge from the cyrstallizer-settler is recycled back to the clarifier at 20. Clear overflow from the clarifier passes via 10 to the first evaporation operation at 11 where it is evaporated to about 46–52% $P_2O_5$. The concentrated product proceeds by 12 to crystallizer-settler 13. Substantially clear supernatant acid leaves the crystallizer-settler at 14 and is passed to the evaporator 15 where it is evaporated to about 56–62% $P_2O_5$ acid. This product is sent via line 16 to product tank 17 and thence to shipping via line 18. Sludge may collect in the product tank 17 and if so may be returned via line 19 to the crystallizer-settler.

The invention is exemplified as follows.

EXAMPLE 1

A commercial production run of crude dilute wet process acid was clarified in a large scale clarifier, and a head sample was taken from the clarifier overflow. The sample analyzed 28.8% $P_2O_5$ and 0.79% $Fe_2O_3$, or a ratio of 0.0274. The sample was split, and two series of experiments were run. Duplicate runs were made in each series. In one series the head sample was used "as is", and to the other, 0.75% of $P_2O_5$ by weight of perlite was added. Both were evaporated to 48–50% $P_2O_5$ concentration, then allowed to settle for 16 hours, then decanted. The supernatants were evaporated to 58–60% $P_2O_5$ and allowed to stand for 2.5 months for final observation.

After the 48–50% concentration and settling for 16 hours, the products were examined. Solids were noted in all four specimens, as follows:

| Test | Volume of Solids | |
| --- | --- | --- |
| | Without Perlite | With Perlite |
| 1 | 13% | 14.9% |
| 2 | 10% | 15.7% |

The samples were shaken to resuspend solids, filtered, and the solids were washed with methanol and weighed, with the following results:

| Test | Weight of Solids from Stated Total Amount of Phosphoric Acid, including Suspended Solids | |
| --- | --- | --- |
| | Without Perlite | With Perlite |
| 1 | 17.2 g. in 400 cc. | 21.8 g. in 370 cc. |
| 2 | 14.2 g. in 550 cc. | 23.2 g. in 575 cc. |

These methanol-washed solids were analyzed for $P_2O_5$, as follows:

| Test | % $P_2O_5$ | |
| --- | --- | --- |
| | Without Perlite | With Perlite |
| 1 | 1.99% | 1.64% |
| 2 | 1.72% | 1.58% |

As described, the supernatants were evaporated to 58–60% $P_2O_5$ and set aside for 2.5 months, after which time they were examined for post-precipitation. The following results were noted:

| Test | Without Perlite | | With Perlite | |
| --- | --- | --- | --- | --- |
| | % $P_2O_5$ | % Sludge by Volume[1] | $P_2O_5$ | % Sludge by Volume[1] |
| 1 | 58.4 | 3.6 | 58.5 | 2.5 |
| 2 | 60.0 | 3.5 | 60.0 | 1.5 |

[1]All precipitates were fluffy, and will flow readily with the acid. For % by weight, divide vol. % by 2.

The product phosphoric acid resulting from the use of this invention has substantially the same characteristics of the acid described in my copending application Ser. No. 54,449, July 3, 1979, to wit:

(1) the solids if any remain substantially suspended and settle out in only small amounts;

(2) the solids if any whether suspended or settled, remain soft, free-flowing, and non-caking;

(3) said acid is readily pumped from storage and does not cake over outlets, valves, and accessory mechanisms; and (4) the said acid can be ammoniated without substantial foaming.

The clarification in vessel (9) can be carried out by conventional settling procedures. I prefer settling in a lamella (used commercially for some years in Florida phosphoric acid operations), but the older Dorr type settler also does a good job. I recommend the following. Filtrate from a conventional filter is pumped to the head box of a mixing launder or tank, where a polymeric flocculant is also added. Polyhall M295, a polyacrylamide-type flocculant commercially available from Stein, Hall & Co., Inc., of New York, N. Y., may be used at a wt. concentration in water of 0.085%. This concentration may be varied from 0.02 to 0.4% by wt. in water without noticeably affecting the results. The Polyhall solution is added to the filtrate at a rate of 0.2% to 3.8% by volume of the 22% to 35% filtrate, preferably 0.8% by volume.

Numerous other flocculants are available for clarification. Examples include water soluble high molecular weight synthetic polymers, guar, etc.

The polyacrylamides and the hydrolyzed polyacrylonitrile resins and their salts and derivatives are particularly useful. Flocculants are used conventionally in the phosphoric acid industry in settling higher concentrations of acid, e.g., 42%, 52% and 54%. Such flocculants are available commercially and are useful in this invention.

A temperature drop of the filtrate of 1° C. to 20° C. is beneficial to proper clarification. The feed to the clarifier is preferably from 30° to 65° C. with best results obtained between 46° C. to 54° C. The temperature drop is best accomplished in a launder which has partial baffles so the polymer-filtrate mixture must follow a zig-zag path before discharging to a stilling well in the clarifier. A mix tank can be used, but care must be taken to stir very slowly, so as not to disintegrate the flocs.

An underflow rate from the clarifier of 2 to 25% by volume of the feed is desirable. For instance for a nominal clarifier feed rate of 6 GPM containing 1 to 3% by wt. of suspended solids, the underflow rate may be 0.48 GPM or about 8% by volume of the feed.

Underflow from the clarifier may be filtered and washed and the solids discarded. Or, the underflow may be recycled to the digestion circuit, as elsewhere herein described.

Depending on the grade of rock used for digestion in the acid plant there may be times when a small amount of the flocculated material will float rather than sink. To overcome this a baffle may be placed in front of the overflow weir in the clarifier and a skimming device such as shown on page 19-50 of *Chemical Engineers Handbook,* Perry, Chilton and Kirkpatrick, 4th edition, McGraw-Hill Book Co., New York. This float material after skimming may be combined with the normal clarifier underflow.

Following clarification, the acid is evaporated to 46–52% $P_2O_5$, preferably 48 to 49% $P_2O_5$ in any conventional evaporator (9).

After this first evaporation the evaporator product is introduced to a crystallizer-settler (13) as used in the conventional Hill process in Florida. Here the acid has a residence time of least 8–10 hours and even more preferably at least 30 hours. The crystallizer is preferably provided with a recycle tube and cone tank. The cone is tapered and equipped with rakes to discharge the acid-crystal product from a centrally located annular opening at the bottom.

Preferably the underflow sludge product of the crystallizer-settler is returned to the clarifier (9). Alternately it may be subjected to gravity settling for a period of time sufficient to allow the heavier crystals (sludge) to settle out. These settling crystals form a slurry of about 25% by wt. of solids. This slurry which is approximately 1 to 10% by volume of the crystallizer feed, and generally 2 to 4% by volume, then may either be used to make dry products such as diammonium phosphate, triple superphosphate, or run-of-pile triple superphosphate or may be sent to the conventional 30% acid filter.

The crystallizer-settler overflow is next evaporated to 56–62% $P_2O_5$ concentration, and preferably to about 59–61%. This product, which is now stabilized, may be shipped directly or sent to storage tanks until ready for use. Some additional solids may come out because of cooling; however, these solids are generally harmless. Preferably any sediment dropping out in local storage tanks (17) is returned to crystallizer-settler (13).

Additional apparatus description and operational details of clarifiers, evaporators, and crystallizers are given in my U.S. Pat. No. 4,110,422, Cols. 9 and 10.

Preferred embodiments include:

(1) The $Fe_2O_3/P_2O_5$ weight ratio in the clarifier feed is 0 to 0.028.

(2) The first evaporation (in 11) concentrates the acid to 48 to 49% $P_2O_5$.

(3) The second evaporation (in 15) concentrates the acid to 59 to 61% $P_2O_5$.

(4) Clarifier (9) underflow is recycled to the reaction train (1).

(5) Crystallizer-settler underflow (20) is recycled to the clarifier.

(6) Storage tank (17) sediment is recycled to the crystallizer-settler (13).

Analytical

Except for solids and iron, analyses were made by procedures in "Methods Used and Adopted by the Association of Florida Phosphate Chemists," Fifth Ed., 1970 ("AFPC"). Where more than one method is provided, the selections were as follows:

P, Photometric method (phosphate rock), p. 80.
Aluminum oxide, Atomic absorption method, p. 95.
F, Specific ion electrode method, p. 104A.
Water, Karl Fischer method, p. 127.
Phosphoric acid in phosphoric acid, Total phosphoric acid method, p. 132.

Solids were determined by the following procedure:

Apparatus a. Vacuum filtration system
b. Drying oven adjusted to 105° C.
c. Gooch crucible, porcelain, with perforated bottom Reagents:

a. Asbestos—Powminco brand or equivalent, special for Gooch crucibles, acid washed. This grade asbestos as received should be thick slurried with water and blended in a Waring blender or equivalent for 10 seconds. The blended slurry should then be placed in an Erlenmeyer flask and washed 3–5 times by adding distilled water and decanting to remove the extremely fine material. The washing is accomplished by thoroughly shaking the blended asbestos with each water wash and then allowing it to settle for 5–10 minutes before decantation of the excess water and fine material.
b. Methanol, absolute.

Determination

Prepare the Gooch crucible with a pad of asbestos which filters freely under medium suction. (In lieu of asbestos, glass fibers can be used.) Pad should be thick enough to retain all suspended solids. Wash pad several times with distilled water, finally with methanol, and place in drying oven at 105° C. for a minimum of one hour. Remove from drying oven and place in desiccator until cool. Reject or rework crucibles which visually show evidence of pad separation from crucible walls. Weigh crucible rapidly and record tare weight. Resuspend solids in sample by shaking thoroughly. Immediately weigh approximately five–ten grams of sample, accurately weighed, into the crucible. Place the crucible and contents on a filter flask and filter with strong vacuum until all of the liquid portion has been filtered through. Wash the solids five times with five ml portions of methanol allowing each wash to filter through completely. Remove crucible from suction and place in the drying oven at 105° C. for a minimum of one hour. Cool in desiccator and weigh rapidly as soon as cool.

$$\% \text{ Suspended Solids} = \frac{\text{Weight of Residue}}{\text{Weight of Sample}} \times 100$$

In these analyses, samples are well shaken, then immediately analyzed. Thus, values for $P_2O_5$, lime, silica, iron, alumina, etc. include components in both liquid and solid phases.

Ferrous and ferric iron were determined by the following procedure:

Reagents a. Standard Potassium Dichromate
   A 0.1 N. solution is made by dissolving 4.904 grams and diluting to one liter with distilled water.
b. Stannous Chloride
   Sixty grams of the crystallized salt is dissolved in 600 ml of concentrated HCl and made up to 1 liter with distilled water.
c. Phosphoric Acid-Sulfuric Acid Mixture
   150 ml concentrated $H_2SO_4$ and 150 ml concentrated $H_3PO_4$ are diluted to 1 liter with distilled water.
d. Mercuric Chloride
   A saturated solution of $HgCl_2$ (60-70 grams per liter) is made.
e. Diphenylamine
   One gram of diphenylamine is dissolved in 100 ml of $H_2SO_4$.

Determination

A 5.00 gram sample of acid is weighed into a 250 ml beaker. About 100 ml of distilled water is added to the beaker. Then 15 ml of the phosphoric-sulfuric acid mixture and 4 drops of diphenylamine are added. The solution is stirred and potassium dichromate is added drop by drop until a deep purple color develops. The milliliters of potassium dichromate is recorded and used in the calculation for ferrous iron.

A total iron is run by weighing out 5.00 grams into a 250 ml beaker, adding 25 ml of 1:1 HCl and about one ml of 2% potassium permanganate solution, placing this on the hot plate and boiling until the color of permanganate is destroyed. The iron is then reduced by adding stannous chloride drop by drop until the solution is colorless. Add one-two drops in excess. The solution is allowed to cool to room temperature. The solution is diluted to 100 ml and 15 ml saturated mercuric chloride is added. Add 15 ml of phosphoric-sulfuric acid mixture and 4 drops of diphenylamine indicator. Potassium dichromate is added drop by drop to the stirred solution until a deep purple end point develops.

Calculation:

$$\% \text{ Ferrous Iron} = \frac{\text{ml Titration for Ferrous}}{\text{wt of sample}} \times .005585 \times 100$$

$$\% \text{ Total Iron} = \frac{\text{ml Titration for total}}{\text{wt of sample}} \times .005585 \times 100$$

$$\% \text{ Ferric Iron} = \% \text{ Total Iron} - \% \text{ Ferrous Iron}$$

I claim:

1. The method of preparing a solids-containing wet process phosphoric acid having a $P_2O_5$ concentration of 56-62 weight % wherein said solids remain substantially suspended, and are soft, free-flowing, and non-caking; said acid prepared in the absence of perlite and consisting essentially of the following steps:
   (a) preparing a crude dilute acid in a wet process reaction train, said acid having a $P_2O_5$ content of 22-45 weight percent and having an $Fe_2O_3/P_2O_5$, weight ratio not in excess of 0.03;
   (b) removing a suspended solids from the said acid in a clarification zone to provide a clarified acid having less than 2% by volume of suspended solids and a sludge-containing residue;
   (c) evaporating the clarified acid to a $P_2O_5$ content of 46-52%;
   (d) charging the evaporated acid to a crystallizing-settling zone to permit settling sludge from the acid, and settling for at least 8 hours;
   (e) passing substantially sludge-free acid from the crystallizing-settling zone to an evaporating zone, and evaporating said acid to a $P_2O_5$ content of 56-62%, said acid characterized in that ammoniation is possible without substantial foaming.

2. Method according to claim 1 in which the $Fe_2O_3/P_2O_5$ ratio in (a) is 0-0.028.

3. Method according to claim 1 or claim 2 in which the evaporation in (c) is to a $P_2O_5$ content of 48-49%.

4. Method according to claim 1 or claim 2 in which the evaporation in (e) is to a $P_2O_5$ content of 59-61%.

5. Method according to claim 1 or claim 2 in which the settling time in (a) is 8-60 hours.

6. Method according to claim 1 in which the sludge-containing residue in (b) is returned to the reaction train in (a); sludge in the crystallizing-settling zone in (d) is returned to the clarification zone in (b); product acid in (e) is sent to a storage zone where it is allowed to deposit sediment, and said sediment is returned to the crystallizing-settling zone in (d).

* * * * *